United States Patent [19]

Kubo

[11] Patent Number: 5,436,625

[45] Date of Patent: Jul. 25, 1995

[54] FOLDING ELECTRONIC DEVICE

[75] Inventor: Satoko Kubo, Tokyo, Japan

[73] Assignee: Sony Corporation, Tokyo, Japan

[21] Appl. No.: 11,421

[22] Filed: Jan. 29, 1993

[30] Foreign Application Priority Data

Jan. 30, 1992 [JP] Japan .................................. 4-040171

[51] Int. Cl.⁶ .............................................. H04N 5/44
[52] U.S. Cl. ................................ 341/22; 340/825.69;
340/825.72; 348/734
[58] Field of Search ...................... 341/176, 173, 22, 23,
341/20; 455/89, 90, 128, 347, 348, 349, 351,
352; 348/734; 340/825.22, 825.24, 825.25,
825.69, 825.72

[56] References Cited

U.S. PATENT DOCUMENTS

| | | | |
|---|---|---|---|
| 5,039,846 | 8/1991 | Komaki | 235/1 D |
| 5,063,484 | 11/1991 | Tanaka | 358/194.1 X |
| 5,181,024 | 1/1993 | Tsunoda et al. | 358/194.1 X |

FOREIGN PATENT DOCUMENTS 2146813  4/1985  United Kingdom .

Primary Examiner—John K. Peng
Assistant Examiner—Daniel J. Wu
Attorney, Agent, or Firm—Jay H. Maioli

[57] ABSTRACT

A folding electronic device, such as a folding remote controller for controlling a television set or a folding cordless telephone comprises a folding case consisting of a first case and a second case; a hinge pivotally joining the first and second cases; first input means arranged on the inner walls of the first and second cases so as to be concealed when the folding case is folded; and second input means arranged on the outer surface of the second case; and a control means for nullifying the operation of the second input means when the folding case is unfolded. The operation of the second input means is nullified by the control means even if the second input means are operated accidentally while the folding case is in an unfolded state. In a modification, the hinge is provided with a battery chamber for containing a power supply, so that the folding electronic device does not need any additional space for containing a power supply.

4 Claims, 3 Drawing Sheets

FOLDING ELECTRONIC DEVICE

BACKGROUND OF THE INVENTION

1. Field of the Invention

The present invention relates to a folding electronic device, such as a remote controller.

2. Description of the Related Art

A folding remote controller for controlling a television set has been proposed. The folding remote controller is designed on condition that input means, such as push buttons and keys, arranged on the outer wall of the folding remote controller as folded are not operated when the folding remote controller is unfolded. However, it is possible that the input means are operated accidentally, causing malfunctions. The position of a battery pocket for containing batteries needs to be determined properly to construct the folding remote controller in a compact construction.

SUMMARY OF THE INVENTION

Accordingly, it is a first object of the present invention to provide a folding electronic device provided with input means, such as push buttons and keys, arranged on the outer wall thereof as folded and capable of preventing malfunctions even if the input means are operated accidentally after unfolding the folding electronic device.

A second object of the present invention is to provide a folding electronic device capable of containing batteries and having a compact construction.

A folding electronic device in a first aspect of the present invention comprises: a folding case consisting of a first case and a second case pivotally joined to the first case by a hinge; first input means arranged on the inner wall of the folding case; and second input means arranged on the outer wall of the folding case; the improvement comprising control means for nullifying the operation of the second input means when the folding case is unfolded.

A folding electronic device in a second aspect of the present invention comprises: a folding case consisting of a first case and a second case pivotally joined to the first case by a hinge; and input means arranged on the inner wall of the folding case; wherein the hinge is provided with a battery chamber for containing a battery as a power supply.

In the folding electronic device in the first aspect of the present invention, the second input means are effective when the folding case is folded, and the control means nullifies the operation of the second input means when the folding case is unfolded. Accordingly, the folding electronic device will not malfunction even if the second input means are operated accidentally after the folding case has been unfolded.

In the folding electronic device in the second aspect of the present invention, since the power supply, such as a battery is contained in the battery chamber formed in the hinge, the folding electronic device does not need any additional space for storing the battery and hence the folding electronic device can be formed in a compact construction.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
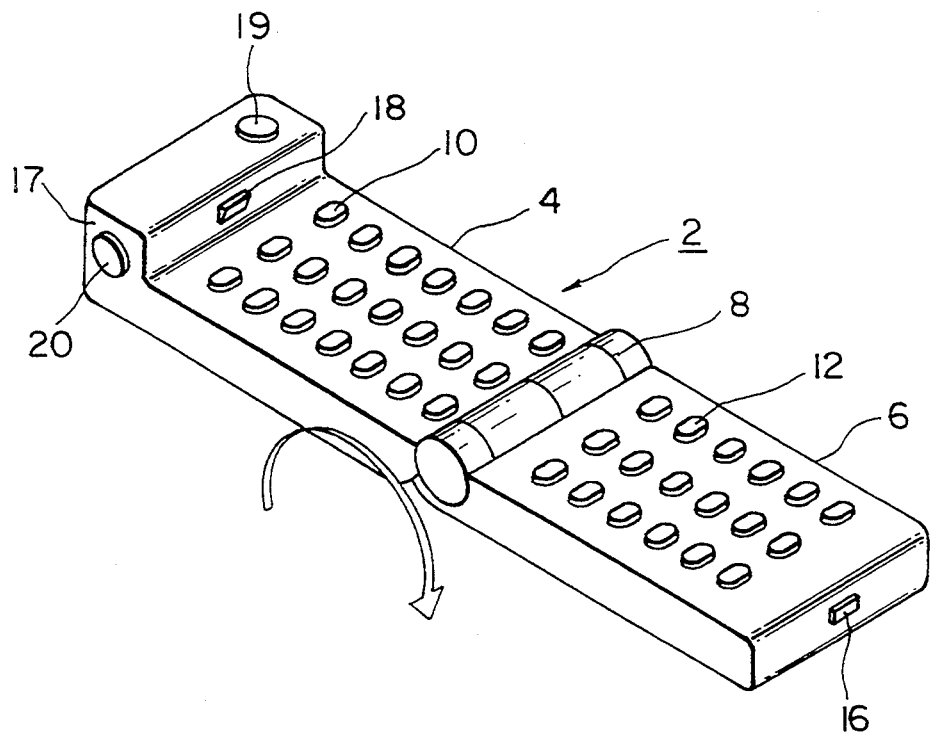
FIG. 1 is a perspective view of a folding wireless remote controller in a first embodiment according to the present invention in an unfolded state.
Figure 2:
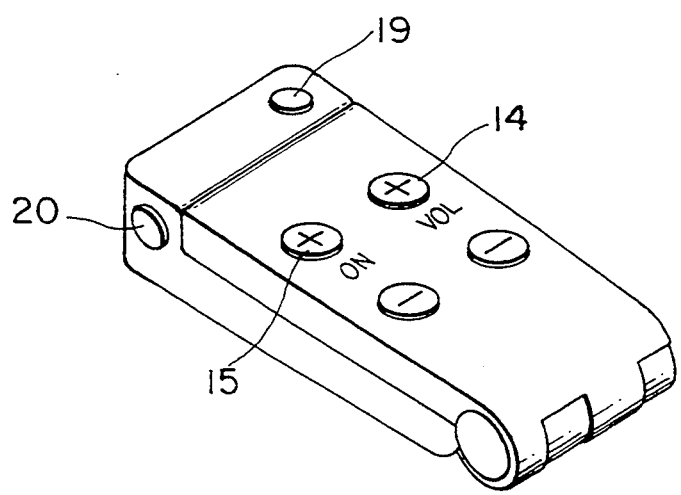
FIG. 2 is a perspective view of the folding wireless remote controller of FIG. 1 in a folded state.
Figure 3:
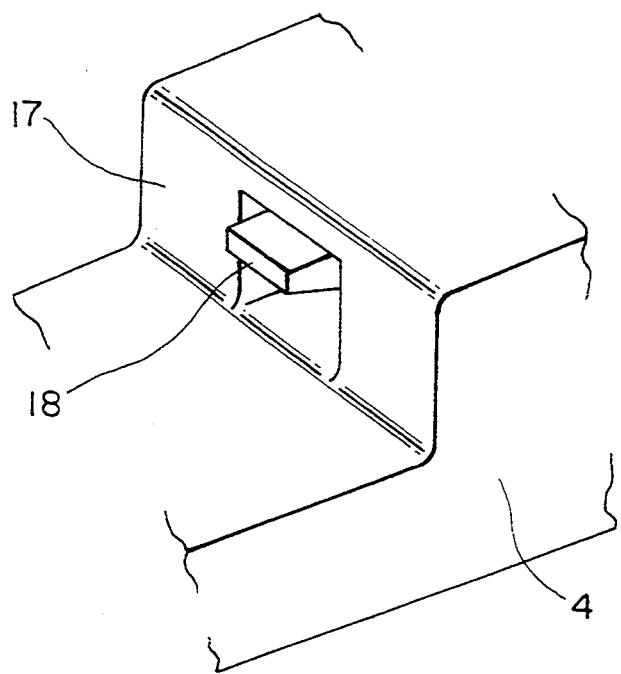
FIG. 3 is an enlarged perspective view of a hook included in the folding wireless remote controller of FIG. 1.

FIGS. 1 and 2 show a folding wireless remote controller 2 in a first embodiment according to the present invention for controlling a television set. The folding wireless remote controller 2 comprises a folding case consisting of a first case 4 and a second case 6 pivotally joined to the first case 4 by a hinge 8, push buttons 10, which need not be operated frequently for controlling the television set, arranged on the inner wall of the first case 4, push buttons 12, which need not be operated frequently for controlling the television set, arranged on the inner wall of the second case 6, a volume regulating button 14 and a channel selector button 15, which need to be operated frequently for controlling the television set, arranged on the outer wall of the second case 6.

The free end of the inner wall of the first case 4 is raised to form a step 17. A power button 19 is provided on the inner surface of the step 17 and an unlocking button 20 is provided on the outer side surface of the step 17. The unlocking button 20 is pushed to unfold the folding case in an unfolded state as shown in FIG. 1, in which the first case 4 and the second case 6 are opened. A hook 18 is supported on the inner side wall of the step 17 and a projection 16 projects from the end wall of the second case 6. When the folding case is folded by putting together the first case 4 and the second case 6, the projection 16 is caught by and pushes the hook 18 to lock the folding case in a folded state as shown in FIG. 2. When the folding case is thus folded and the hook 18 is thus pushed, an electronic circuit (not shown) contained in the first case 4 makes the operation of the volume regulating button 14 and the channel selector button 15 effective.

When the unlocking button 20 is depressed to unlock the folding case, the projection 16 is released from the hook 18 and the hook 18 is allowed to advance. In this state, the electronic circuit (not shown) nullifies the operation of the volume regulating button 14 and the channel selector button 15. Therefore, the operation of the volume regulating button 14 and the channel selector button 15 is ineffective when the folding case is unfolded and hence any control operation is not executed even if the volume regulating button 14 and the channel selector button 15 are operated accidentally when the folding case is unfolded.

If the folding remote controller 2 is designed for controlling both a television set and a video tape recorder, buttons for controlling the video tape recorder may be arranged on the inner walls of the first case 4 and the second case 6 and buttons for controlling the video tape recorder may be arranged on the outer surfaces of the second case 6 so that the former buttons are concealed and the latter buttons are exposed when the folding remote controller 2 is folded.

The hinge 8 may be provided with a battery chamber for containing a battery that supplies power to the folding remote controller 2.

Figure 4:
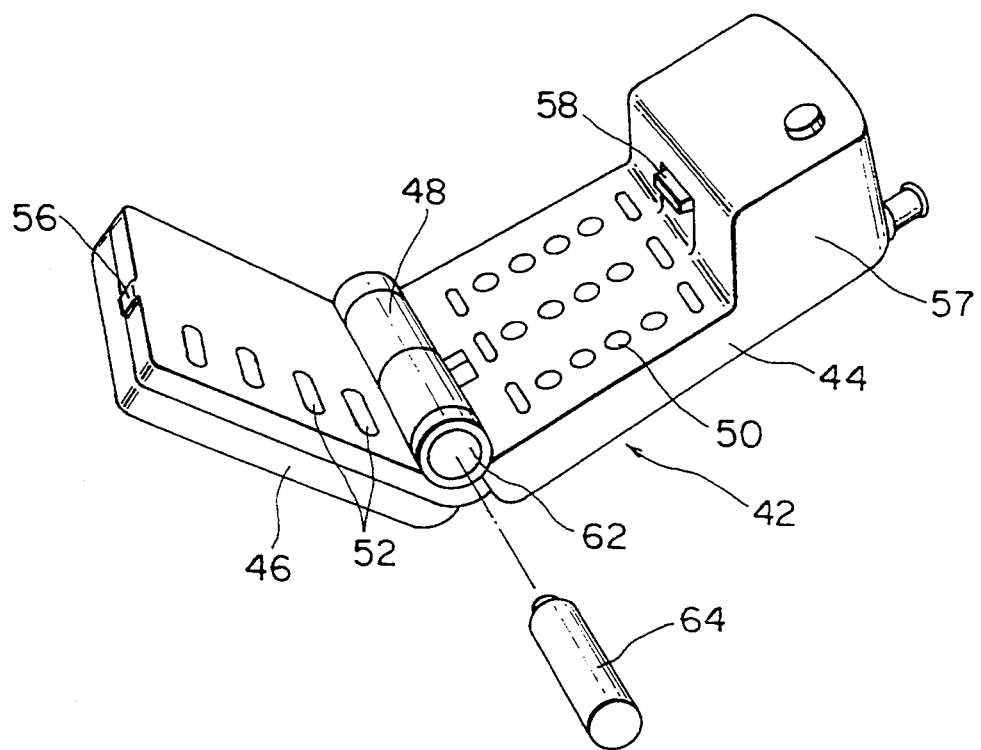
FIG. 4 is a perspective view of a cordless telephone set in a second embodiment according to the present invention in an unfolded state.
Figure 5:
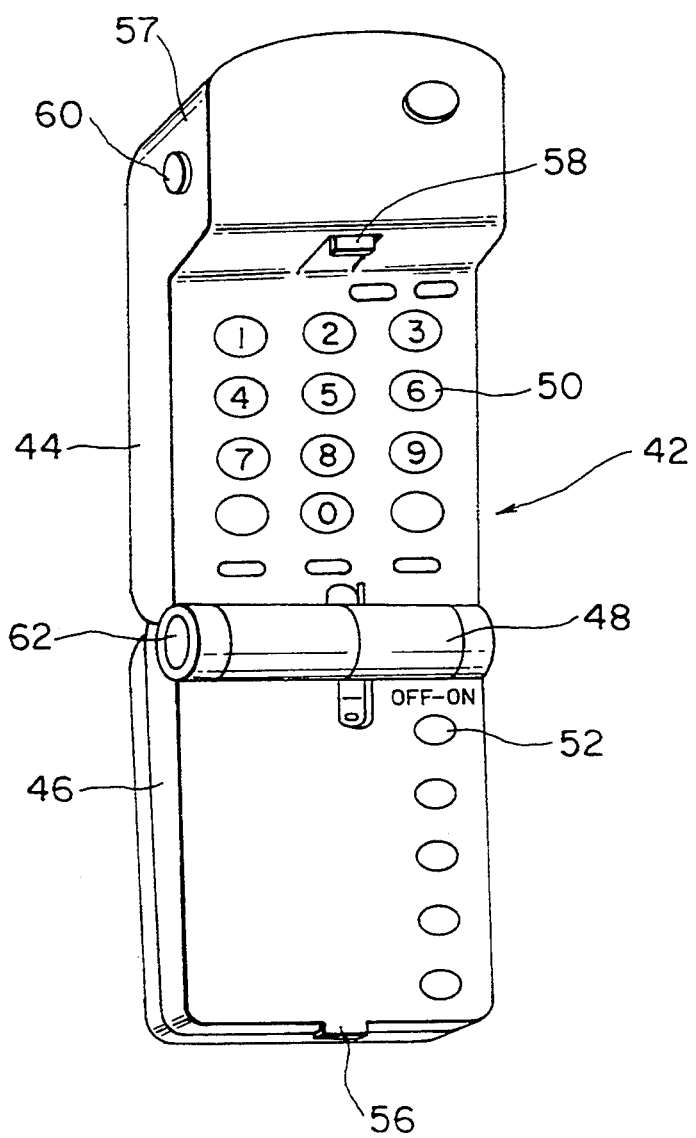
FIG. 5 is another perspective view of the cordless telephone set of FIG. 4 in an unfolded state.

FIGS. 4 and 5 show a cordless telephone set 42 in a second embodiment according to the present invention in an unfolded state. The cordless telephone set 42 comprises a folding case consisting of a first case 44 and a second case 46 pivotally joined to the first case 44 by a hinge 48. Buttons 50 and 52, which need not be operated frequently for operating the cordless telephone set 42 are arranged on the inner walls of the first case 44 and the second case 46. Buttons, not shown, which are operated frequently, are arranged on the outer surfaces of the second case 46.

The free end of the inner wall of the first case 44 is raised to form a step 57. An unlocking button 60 is provided on the outer side surface of the step 57. The unlocking button 60 is depressed to unfold the folding case in an unfolded state, in which the first case 44 and the second case 46 are opened as shown in FIGS. 4 and 5.

A hook 58 is supported on the inner side wall of the step 57 of the first case 44 and a projection 56 projects from the end wall of the second case 46. When the folding case is folded by putting together the first case 44 and the second case 46, the projection 56 is caught by and pushes the hook 58. When the folding case is thus folded and the hook 58 is thus pushed, an electronic circuit, not shown, contained in the first case 44 makes the operation of the buttons arranged on the outer surfaces of the second case 46 effective. When the unlocking button 60 is depressed and the folding case is unfolded, where the first case 44 and the second case 46 are opened, the hook 58 is allowed to advance, and then the electronic circuit (not shown) nullifies the operation of the buttons arranged on the outer surfaces of the second case 46.

The hinge 48 is provided with a battery chamber 62 for containing a battery 64. Therefore, the cordless telephone set 42 does not need any additional space for the battery 64 and hence the cordless telephone set 42 has a compact construction.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A folding electronic device comprising:
    a folding case consisting of a first case and a second case movable between a folded position and an unfolded position;
    a hinge pivotally joining the first and second cases;
    first input means arranged on inner walls of the first and second cases so as to be concealed when the folding case is in the folded position;
    second input means arranged on outer surfaces of the folding case;
    a hook supported on the first case; and
    a projection projecting from the second case for engagement with the hook when the folding case is in the folded position, wherein operation of the second input means is nullified when the folding case is moved to the unfolded position and the projection disengages the hook.

2. A folding electronic device according to claim 1, wherein said hinge is provided with a battery chamber for containing a power supply for powering the folding electronic device.

3. A folding electronic device according to claim 1, wherein said first and second input means are push buttons.

4. A folding electronic device according to claim 1, wherein said first and second input means are push buttons and keys.

* * * * *